(12) United States Patent
Bonne

(10) Patent No.: US 8,519,987 B2
(45) Date of Patent: Aug. 27, 2013

(54) OPERATING AND DISPLAY DEVICE FOR A VEHICLE

(75) Inventor: Uwe Bonne, Büttelborn (DE)

(73) Assignee: GM Global Technology Operations LLC, Detroit, MI (US)

(*) Notice: Subject to any disclaimer, the term of this patent is extended or adjusted under 35 U.S.C. 154(b) by 343 days.

(21) Appl. No.: 12/845,341

(22) Filed: Jul. 28, 2010

(65) Prior Publication Data
US 2011/0025652 A1 Feb. 3, 2011

(30) Foreign Application Priority Data
Jul. 28, 2009 (DE) .................. 10 2009 034 913

(51) Int. Cl.
| G06F 3/033 | (2006.01) |
| G09G 5/00 | (2006.01) |
| H01H 13/70 | (2006.01) |
| H01H 25/00 | (2006.01) |
| H01H 25/04 | (2006.01) |
| H01H 19/00 | (2006.01) |
| H01H 19/58 | (2006.01) |
| H01H 21/00 | (2006.01) |
| H01H 9/00 | (2006.01) |
| H01H 19/62 | (2006.01) |
| H01H 27/00 | (2006.01) |
| H01H 3/00 | (2006.01) |
| H01H 15/24 | (2006.01) |

(52) U.S. Cl.
USPC ............ 345/184; 200/5 R; 200/14; 200/17 R; 200/18; 200/538

(58) Field of Classification Search
USPC .............. 345/184; 200/4, 5 R, 14, 17 R, 18, 200/519, 538–542
See application file for complete search history.

(56) References Cited

U.S. PATENT DOCUMENTS

| 4,668,845 A | 5/1987 | Izumi |
| 5,627,531 A * | 5/1997 | Posso et al. ...................... 341/22 |
| 2006/0290668 A1 * | 12/2006 | Sloo et al. ....................... 345/158 |
| 2009/0079712 A1 * | 3/2009 | Levin et al. ................... 345/184 |
| 2012/0110511 A1 * | 5/2012 | Howard ....................... 715/835 |

FOREIGN PATENT DOCUMENTS

| DE | 19610700 A1 | 9/1997 |
| DE | 19807410 A1 | 8/1999 |
| DE | 19836000 A1 | 2/2000 |
| DE | 19943579 A1 | 11/2000 |

(Continued)

Primary Examiner — Bipin Shalwala
Assistant Examiner — Ilana Spar
(74) Attorney, Agent, or Firm — Ingrassia Fisher & Lorenz, P.C.

(57) ABSTRACT

An operating and display device is provided for a vehicle having a display unit and having a rotary knob for selecting a function and/or for selecting a menu within a hierarchical menu structure shown using the display unit. The rotary knob forming an operating unit is movable in both directions of its rotational axis, and pressing of the operating unit causing navigation between two menu levels in a first hierarchy direction and pulling of the operating unit causing navigation between two menu levels in a second, opposing hierarchy direction of the menu.

12 Claims, 4 Drawing Sheets

(56) References Cited

FOREIGN PATENT DOCUMENTS

| | | |
|---|---|---|
| DE | 19936257 A1 | 2/2001 |
| DE | 10056307 A1 | 5/2002 |
| DE | 10121685 A1 | 11/2002 |
| DE | 10123478 A1 | 11/2002 |
| DE | 10315721 A1 | 11/2004 |
| DE | 102005030361 A1 | 3/2006 |
| DE | 102005045300 A1 | 9/2006 |
| DE | 102006043473 A1 | 3/2008 |
| DE | 102007013124 A1 | 4/2008 |
| EP | 1182535 A1 | 2/2002 |
| EP | 1569073 A2 | 8/2005 |
| WO | 2005009816 A1 | 2/2005 |

* cited by examiner

OPERATING AND DISPLAY DEVICE FOR A VEHICLE

CROSS-REFERENCE TO RELATED APPLICATION

This application claims priority to German Patent Application No. 102009034913.8, filed Jul. 28, 2009, which is incorporated herein by reference in its entirety.

TECHNICAL FIELD

The invention is in the field of operating and display devices for vehicles for selecting functions of any type. The construction and the configuration of devices of this type have a strong influence on the operating friendliness of a vehicle and thus also on the safety while driving a vehicle. Because the operating comfort enjoys a high importance for potential vehicle buyers and can be decisive for the purchase, the significance of optimum operating and display devices is continuously increasing.

BACKGROUND

An operating configuration for motor vehicles having an operating element situated on a steering wheel rim of a steering wheel is known from DE 10 2006 043 473 A1, the operating element being used to activate a vehicle function and being actuatable in at least two actuation directions or actuation levels. The operating element can be designed for actuation by pressing, pulling, turning, tilting, and/or sliding. To activate a vehicle function, an actuation of the operating element in at least two different actuation directions or actuation levels is required; unintentional activation of a vehicle function by inadvertent actuation of the operating element is thus to be avoided. However, this results in a relatively complex and cumbersome actuation and complicates the selection and/or activation of functions. The configuration of pressing, pulling, turning, tilting, or sliding elements on the steering wheel rim of a steering wheel proposed in German Published Application DE 10 2006 043 473 A1 is additionally disadvantageous, because an actuation of these elements can cause an unintended steering deflection.

A multifunctional operating and display device having an operating element for selecting individual functions by menu selection on a display screen and a button or enter function of the operating element for confirming the selected menu or selected menu item is known from German Published Application DE 198 36 000 A1. The operating element is guided so it is displaceable. The current position data of the operating element are detected and converted in a computer into a corresponding menu position of a cursor. The selected menu item can then be selected or confirmed by the button function of the operating element. In this case, however, from a specific hierarchy level of the menu, it is only possible to navigate back to the next higher menu plane or menu item by selecting a separate menu item—namely the item provided for jumping back or jumping out of the current menu level ("back button"). This requires displacement of the operating element or the cursor and selection of the menu item provided for the back navigation. For example, if the user has inadvertently selected a menu level, back navigation is comparatively complex.

With this background, the invention is based on at least one object of specifying an operating and display device for a vehicle, which allows simple and intuitive navigation between various menu levels to select and deselect functions.

In addition, other objects, desirable features, and characteristics will become apparent from the subsequent summary and detailed description, and the appended claims, taken in conjunction with the accompanying drawings and this background.

SUMMARY

Accordingly, the operating and display device for a vehicle according to an embodiment of the invention comprises a display unit and a rotary knob for selecting a function and/or for choosing a menu within a hierarchical menu structure shown using the display unit, the rotary knob forming an operating unit movable in both directions of its rotational axis, and pressing the operating unit causing navigation between two menu levels in a first hierarchy direction and pulling of the operating unit causing navigation between two menu levels in a second, opposing hierarchy direction of the menu.

The embodiments of the invention provide simple and intuitive operability for selecting and deselecting functions and navigating between the menu levels of a hierarchical menu structure. In particular the possibility of pulling the rotary knob to jump up (navigate upward) into a higher-order menu level connects an intuitive movement of the user to the associated navigation movement within the menu structure. In addition, the selection of a separate menu point or operating element, which was required up to this point for the back navigation into a higher-order menu level according to the prior art cited at the beginning, is avoided. A significant increase of the operating comfort is thus implemented and the driving safety is increased.

In an advantageous embodiment of the invention, pulling of the operating unit which exceeds a predefined period of time causes the navigation into the uppermost menu level. This has the advantage that it is not necessary to pull multiple times via a plurality of menu levels in order to reach the hierarchically highest menu level. Rather, direct navigation into the uppermost menu level can be achieved via a simple and intuitive operating action.

According to a further advantageous embodiment of the invention, pressing the operating unit in the hierarchically lowermost menu level causes the selection of desired functions. This property of the operating and display device according to an embodiment of the invention causes a further intuitive simplification during the selection of functions in a menu. Via the selection of menu items which have a specific structure, the vehicle driver reaches specific branches and, via them, a desired function. If navigation to the desired function has been performed, it can be selected by pressing the operating unit. Pressing is thus a purpose-dependent differing input function for two different operating actions.

According to a particularly advantageous embodiment of the invention, the rotary knob is rotatable in catch steps. This has the advantage that a haptically perceptible possibility is given for the vehicle driver of metering the navigation within a menu level and obtaining a haptically perceptible feedback. A cursory view on the display unit is already sufficient to perform the operation as needed. During the actual movement of the rotary knob, the vehicle driver can already concentrate completely on the traffic again and navigate on the basis of the catch steps.

According to a further expedient embodiment of the invention, the movement of the operating unit in the direction of its rotational axis occurs in catch steps. These catch steps give the user haptic feedback of whether the navigation into a lower-order menu level or the selection of a menu item or a function has occurred. A vehicle driver is thus saved a visual check by a look at the display device, which is otherwise required.

According to a particularly expedient design of the invention, the rotary knob comprises a subunit, which is movable relative to the main body of the rotary knob. According to this design, for example, a concentric second rotary knob can be implemented, i.e., a higher-order rotary knob, which comprises a subunit, which in turn forms a (second) rotary knob, for example. Thus, for example, the hierarchical structure of the menu can be transferred to the construction of the operating unit and a particularly intuitively operable display and operating device can be implemented.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
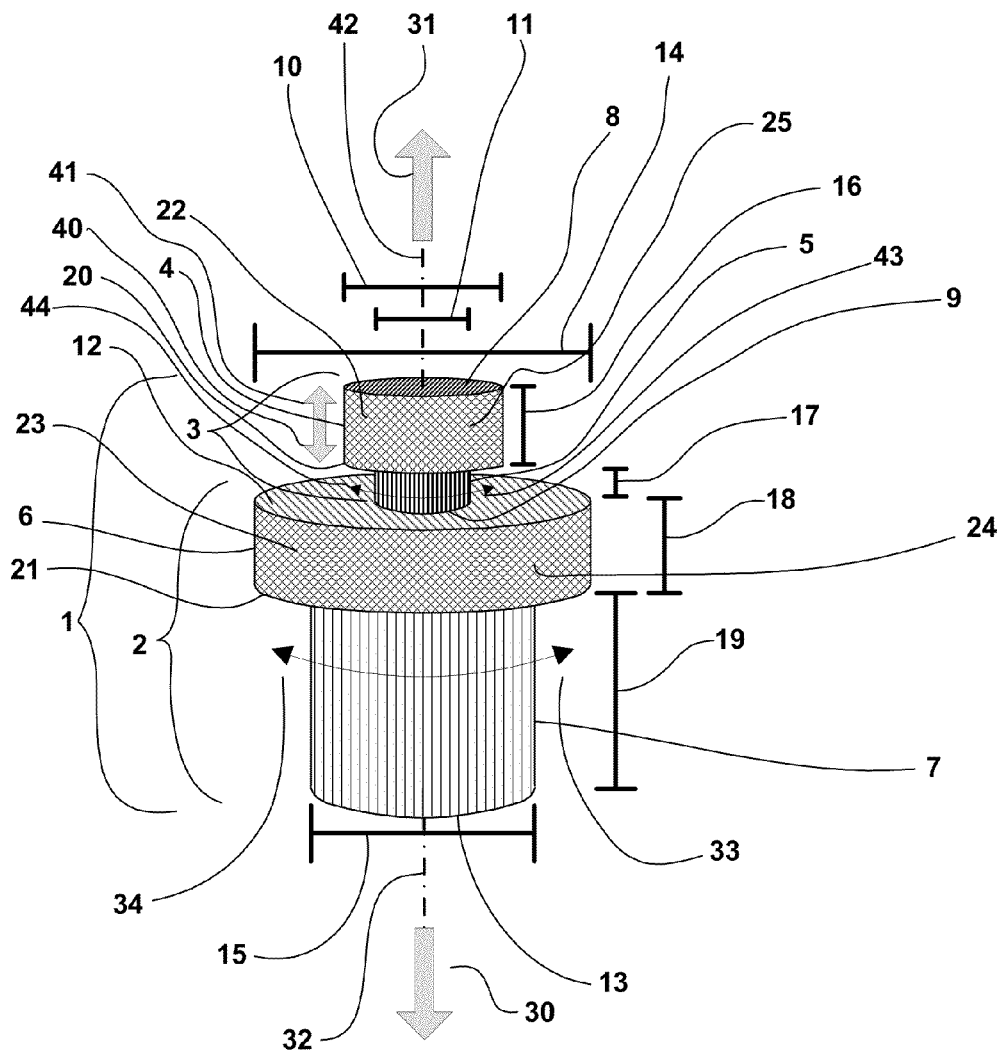
FIG. 1 shows a first device according to an embodiment of the invention.

FIG. 1 shows an operating device in the form of a rotary knob 1 for selecting functions or menus within a hierarchical menu structure. The rotary knob 1 comprises a main body 2 and a subunit 3, which each have the form of two cylinders 4, 5, 6, 7 placed concentrically one on top of another. The bases 8, 9 of the cylinders 4, 5 have different diameters 10, 11. The bases 12, 13 of the cylinders 6, 7 also have different diameters 14, 15. Furthermore, the heights 16, 17 of the cylinders 4, 5 and the heights 18, 19 of the cylinders 6, 7 are different. The upper cylinders 4, 6 of the main body 2 and the subunit 3 each have larger diameters 10, 14 of the bases 8, 12 than the diameters 11, 15 of the bases 9, 13 of the particular lower cylinder. The upper cylinder 6 of the main body 2 has a lesser height 18 than the lower cylinder 7 of the main body 2. The upper cylinders 4, 6 are used as the button 20 of the subunit 3 and as the button 21 of the main body 2, respectively, during the actuation by a user. The lateral surfaces 22, 23 of the cylindrical buttons 20, 21 have a roughened surface structure 24, 25. These surface structures 24, 25 prevent the finger of the operator from slipping off and result in improved gripping capability.

The main body 2 of the rotary knob 1 can be pressed in the pressing direction 30. In addition, the main body 2 can be pulled in a second pulling direction 31, opposite to the pressing direction 30. Furthermore, the main body 2 is rotatable around its rotational axis 32 in the rotational direction 33 and in a further rotational direction 34, opposite to the rotational direction 33.

The subunit 3 of the rotary knob 1 can be pressed in the pressing direction 40 relative to the main body 2. In addition, the subunit can be pulled in a second pulling direction 41, opposite to the pressing direction 40. Furthermore, the subunit 3 is rotatable around a rotational axis 42 in the rotational direction 43 and in a further rotational direction 44, opposite to the rotational direction 43.

Figure 2:
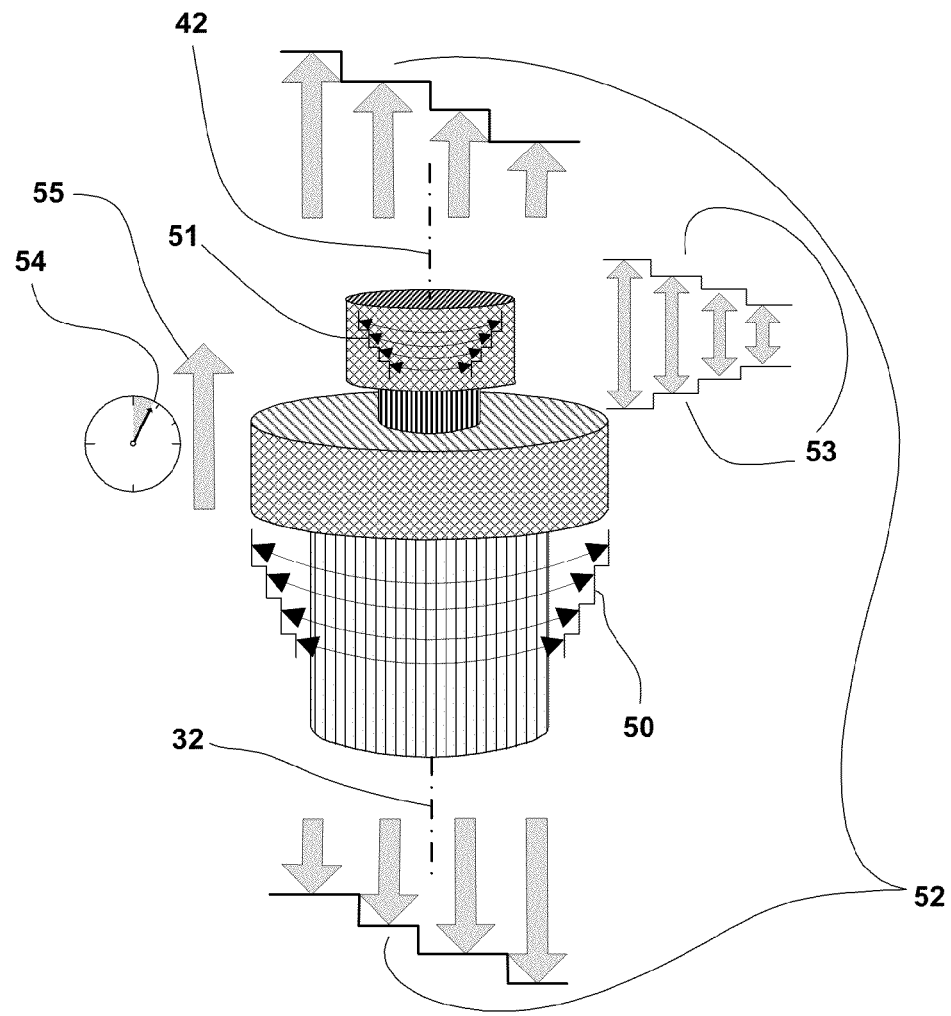
FIG. 2 shows a variant of a device according to an embodiment of the invention.

The variant of a device according to the invention shown in FIG. 2 is essentially constructed like the device shown in FIG. 1. In addition to the variant shown in FIG. 1, the main body 2 and the subunit 3 of the rotary knob 1 is implemented as rotatable in catch steps 50, 51. Moreover, the movement of the main body 2 in the direction of the rotational axis 32 occurs in catch steps 52. Moreover, the movement of the subunit 3 in the direction of the rotational axis 42 occurs in catch steps 53.

The device shown in FIG. 2 has a further possibility for operation. If the main body 2 or the subunit 3 is pulled in the pulling direction 55 for a predefined period of time 54, direct navigation into the uppermost level of the hierarchical menu structure occurs.

Figure 3:
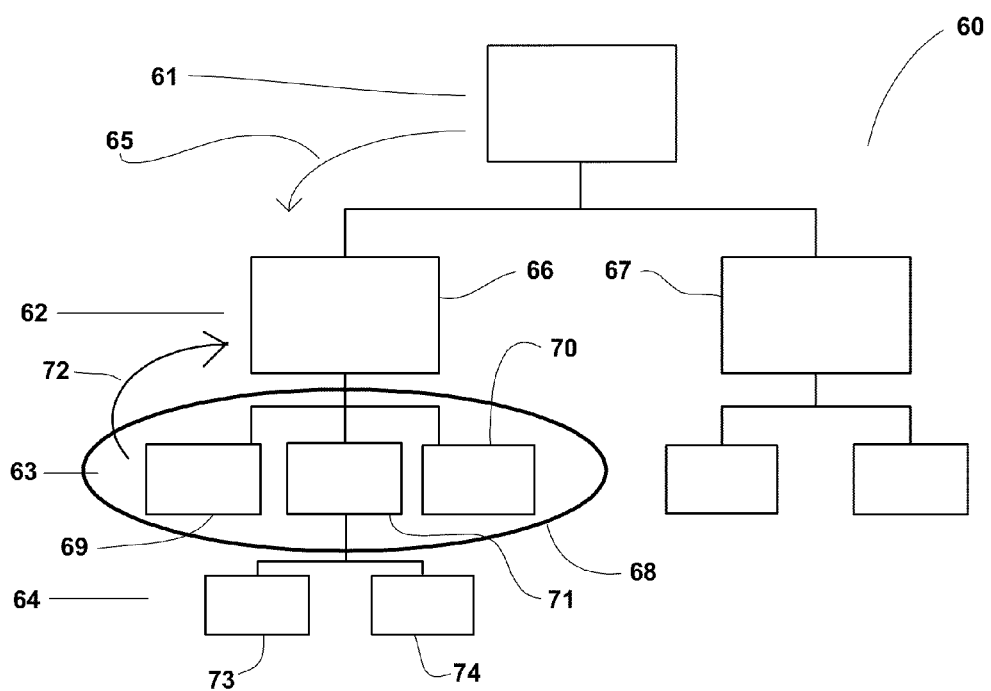
FIG. 3 shows a menu structure.

The operating and display device will be explained in greater detail on the basis of the exemplary menu structure shown in FIG. 3. FIG. 3 shows a schematic construction of a hierarchically structured menu 60. The menu 60 has four levels 61, 62, 63, 64. Navigation can be performed between these levels and within these levels using the rotary knob 1 shown in FIG. 1. After the display device is turned on or after the vehicle is started, the navigation starts in the uppermost menu level 61, for example. By pressing the operating element, the user navigates in the (downward) hierarchy direction 65 into the next lower level 62. Turning the operating element causes navigation between branches 66 and 67 in the level 62. A further press of the operating element confirms the selection of one of the selected branches 66 or 67.

For example, if the branch 66 is selected, the operating and display device jumps into the area 68 in the level 63. Navigation can occur between the function 69, 70 and the branch 71 in this area 68. By pulling the operating element, back navigation occurs in the (upper) hierarchy direction 72 back to the level 62.

If the branch 71 is selected by pressing the operating unit, the operating and display device jumps into the level 64. In this level 64, navigation can be performed between the functions 73 and 74. These functions 73 and 74 may also each be activated by pressing the operating unit.

Figure 4:
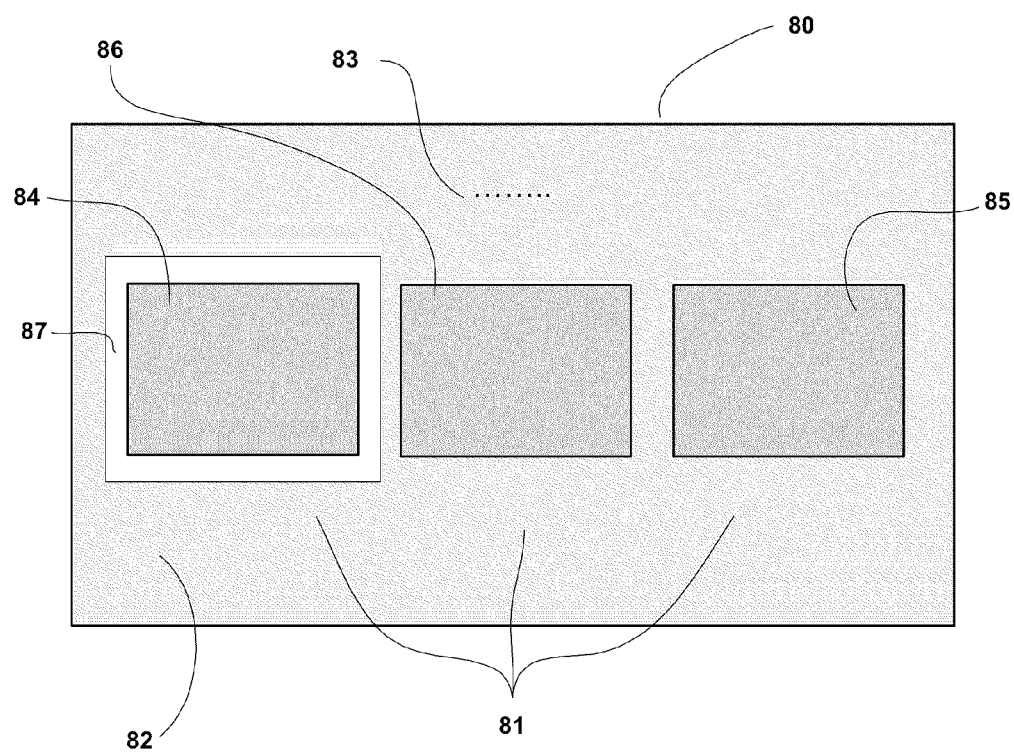
FIG. 4 shows an embodiment variant of the display of a menu level of a device according to an embodiment of the invention.

The embodiment variant of a display unit 80 shown in FIG. 4 illustrates an exemplary view of a menu 81 in the level 63 in the area 68 of the menu structure shown in FIG. 3. The menu 81 is shown on a rectangular surface 82. On the one hand, information 83 with respect to the current level and the current area is displayed on this surface. Furthermore, the functions 84, 85 and the branch 86 are shown as selectable, rectangular surfaces. The functions 84 and 85 correspond to the functions 69 and 70 in FIG. 3. The branch 86 corresponds to the branch 71 in FIG. 3. By turning the rotary knob 1 shown in FIG. 1, navigation can be performed between the functions 84, 85 and the branch 86. The white frame 87 identifies the currently selected element in the navigation and jumps between the elements when the rotary knob is turned. If an element is identified by the white frame 87, it can be selected by pressing the rotary knob. This causes, depending on whether it is one of the functions 84, 85 or the branch 86, an activation of the function 84, 85 or a jump from the branch 86 into the next lower-lying menu level 64. Pulling of the rotary knob in this display causes a jump into a higher-order menu level 62 in the menu structure (FIG. 3).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An operating and display device for a vehicle, comprising:
    a display unit; and
    a rotary knob adapted to select a function using the display unit, the rotary knob including a main body and a subunit that are concentric with each other and may be pressed independently of each other, and wherein the main body and the subunit each include two concentric cylinders disposed one on top of the other;
    wherein the rotary knob is adapted to form an operating unit movable in both directions of a rotational axis pressing the operating unit is adapted to cause a navigation between at least two menu levels in a first hierarchy direction, and pulling the operating unit is adapted to cause the navigation between the at least two menu levels in a second and opposing hierarchy direction of a menu, and wherein a movement of the operating unit in the direction of the rotational axis occurs in catch steps.

2. The device according to claim 1, wherein the pulling of the operating unit that exceeds a predefined period of time causes the navigation into an uppermost menu level.

3. The device according to claim 1, wherein the pressing of the operating unit in a lowermost menu level causes a selection of desired functions.

4. The device according to claim 1, wherein the rotary knob is rotatable in catch steps.

5. The device according to claim 1, wherein the rotary knob is disposed on a component of the vehicle and configured for use by a driver of the vehicle.

6. The device according to claim 1, wherein the two concentric cylinders of the main body and the subunit each include upper cylinders and lower cylinders, wherein the lower cylinders have diameters that are less than diameters of the upper cylinders, and wherein the upper cylinder of the main body has a height that is less than a height of the lower cylinder of the main body.

7. An operating and display device for a vehicle, comprising:
    a display unit; and
    a rotary knob adapted to select a menu within a hierarchical menu structure shown using the display unit, the rotary knob including a main body and a subunit that are concentric with each other and may be pressed independently of each other, and wherein the main body and the subunit each include two concentric cylinders disposed one on top of the other;
    wherein the rotary knob is adapted to form an operating unit movable in both directions of a rotational axis pressing the operating unit is adapted to cause a navigation between at least two menu levels in a first hierarchy direction, and pulling the operating unit is adapted to cause the navigation between the at least two menu levels in a second and opposing hierarchy direction of the menu, and wherein a movement of the operating unit in the direction of the rotational axis occurs in catch steps.

8. The device according to claim 7, wherein the pulling of the operating unit that exceeds a predefined period of time causes the navigation into an uppermost menu level.

9. The device according to claim 7, wherein the pressing of the operating unit in a lowermost menu level causes a selection of desired functions.

10. The device according to claim 7, wherein the rotary knob is rotatable in catch steps.

11. The device according to claim 7, wherein the rotary knob is disposed on a component of the vehicle and configured for use by a driver of the vehicle.

12. The device according to claim 7, wherein the two concentric cylinders of the main body and the subunit each include upper cylinders and lower cylinders, wherein the lower cylinders have diameters that are less than diameters of the upper cylinders, and wherein the upper cylinder of the main body has a height that is less than a height of the lower cylinder of the main body.

\* \* \* \* \*